United States Patent Office 3,417,939
Patented Dec. 24, 1968

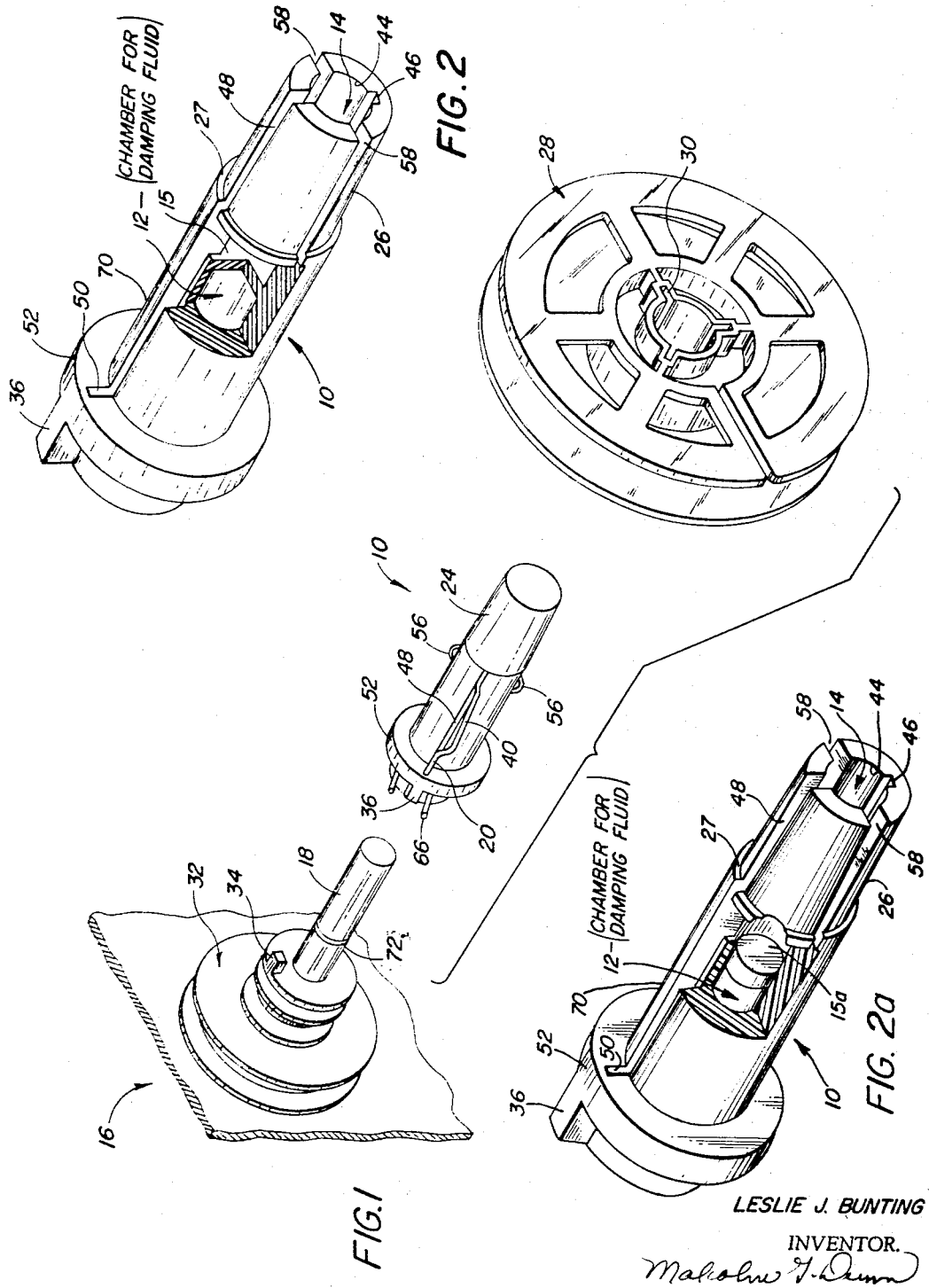

3,417,939
SPINDLE FOR SUPPORTING REELS OR SPOOLS FOR ROTATION
Leslie J. Bunting, Rochester, N.Y., assignor to Eastman Kodak Company, Rochester, N.Y., a corporation of New Jersey
Continuation of application Ser. No. 591,315, Nov. 1, 1966. This application Oct. 16, 1967, Ser. No. 679,587
15 Claims. (Cl. 242—68.3)

ABSTRACT OF THE DISCLOSURE

An apparatus for receiving and supporting for rotation on a film projector a reel of strip material. The apparatus comprises a spindle in the shape generally of a hollow cylinder having at one end an open ended chamber which is adapted to be received and to rotate on a fixed shaft of the projector, and having at the other end slots and an open ended chamber to receive and support a reel drive spring and a reel detent spring to drive and to retain the reel on the spindle. A cap fits over the latter chamber to securely hold the springs in proper position.

---

Figure 3:
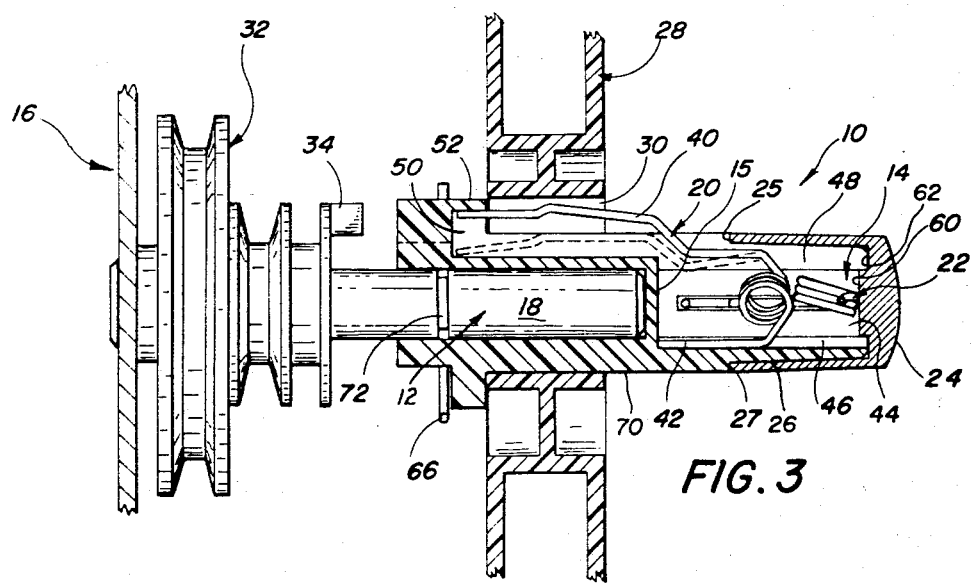

This application is a continuation of Ser. No. 591,315, now abandoned.

The present invention relates to spindles for receiving and supporting for rotation reels or spools of strip material on film projectors and other apparatus using spools, and particularly is directed to an improved molded spindle that is to be assembled on a film projector or the like.

In copending U.S. application Ser. No. 397,451, entitled Automatic Rewinding Mechanism for Film or the Like, filed Sept. 18, 1964 in the name of Robert J. Roman, and issued on Jan. 24, 1967, as Patent No. 3,300,155, there is disclosed an automatic rewind mechanism for a motion picture projector and which operates, when actuated by film tension, to disengage the film from the transport claw, to disconnect the drive system from the take-up reel and to connect the drive system to the supply reel. The supply reel is mounted on a spindle, and the spindle is assembled on a fixed shaft of a projector. The spindle in that application is described as being held on the fixed shaft by means of a wire hair pin-shaped spring (not shown) one leg of which is inserted in a slot provided at one end of a spindle to fit within a groove (also not shown) that is formed in the fixed shaft. The other leg of the spring engages a portion of the outer peripheral surface of the spindle. In this manner of connection, the spindle is free to rotate relative to the shaft but is still retained in operative position on the shaft. An additional slot provided in the same end of the spindle was illustrated and described for the purpose of receiving an additional wire by which a slight friction drag is applied to the spindle as the spindle rotates around the shaft so as to improve the smoothness of reel rotation. Since the transport claw operates in intermittent manner to advance the film past the film gate of the projector, there is a tendency for intermittent pulsations to be transmitted along the length of the film between the film gate and the supply reel to cause the reel to rotate in short quick motions. These motions are retransmitted along the length of the film back to the film gate and tend to effect the registration of the film in the film gate. Thus the aforementioned slight friction drag is for the purpose of eliminating the adverse influences on the film in the film gate.

In an improved motion-picture projector that was constructed for commercial use after the above application disclosed, the additional slot in the one end of the spindle was eliminated and smoothness of reel rotation was obtained by injecting a silicon-based damping fluid within the spindle chamber. The fluid between the fixed shaft and the inside peripheral surface of the spindle chamber is rate sensitive and tends to smoothe out the rotation of the reel by a dampening effect. Since the spindle in the improved projector also has a detent spring arrangement as well as a reel drive spring arrangement, which are both installed within the spindle chamber at the other end of a spindle and which project through openings in that end of the spindle above the outer peripheral surface of the spindle, it is necessary to insert a plug of material between the detent and reel drive spring arrangements so as to prevent the damping fluid from escaping through the openings in the spindle through which the detent and reel drive spring arrangements project. This is rather an involved operation which requires that the two spring arrangements be inserted through the inner end opening (the end closest to the projector) of the spindle, and then the plug of material is inserted before the fluid is injected.

Accordingly, an object of the present invention is to provide an improved molded spindle having two separated chambers with an inner chamber in which the fixed shaft of a projector will be received for supporting the spindle for free rotation relative to the shaft, and the damping fluid will be injected and contained; and with an outer chamber in which assembly and retention of the reel detent and drive spring members will be greatly facilitated. In this manner the damping fluid will not escape through openings through which those portions of the reel detent and drive spring members normally project, as would tend to occur in a spindle construction of the prior art.

Other objects of the invention will become apparent to those skilled in the art to which this invention pertains from the description of the drawings and in the specification.

Figure 4:
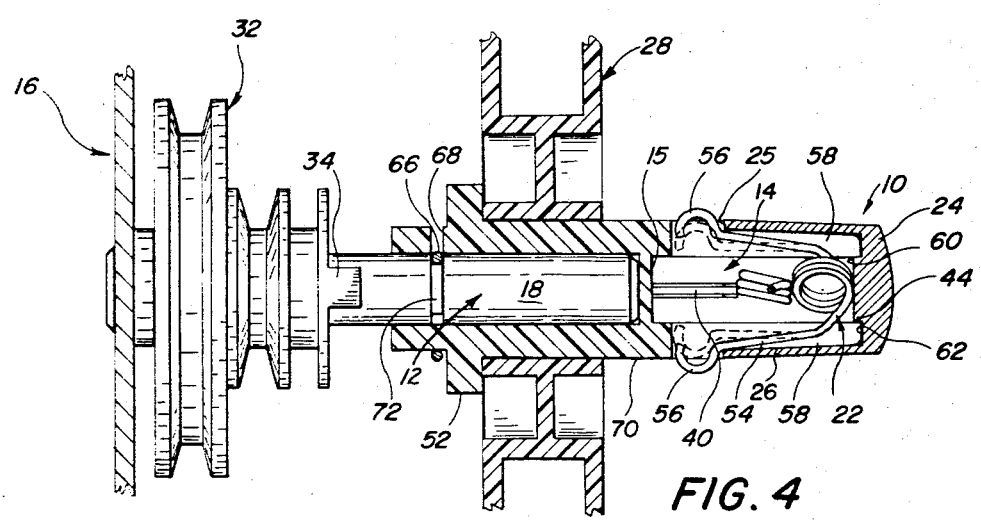

In the drawings:

In FIG. 1 is illustrated an exploded perspective view in elevation of a portion of the projector and of the projector drive mechanism, spindle and reel;

In FIG. 2 is illustrated an enlarged perspective view of the molded spindle showing the slots and grooves that are formed in the walls of the molding, and with the spindle broken away at one portion to illustrate the integrally formed wall between the two chambers of the spindle and the blind groove for the spindle drive spring member;

In FIG. 2a is illustrated an enlarged perspective view of the molded spindle showing a further embodiment, similar to the embodiment of FIG. 2, wherein a plug is used instead of an integral wall to separate the spindle into two chambers;

In FIG. 3 is illustrated a cross section of the spindle as assembled in operative position on the fixed shaft of a projector, and of a cross-sectional portion of the reel in operative position on the spindle; and In FIG. 4 is illustrated a view similar to that in FIG. 3 but with the spindle on the fixed shaft rotated 90°.

In reference to the drawings, the spindle indicated at 10 is also illustrated in part in co-pending U.S. application Ser. No. 591,248, entitled Rim Trap for Photographic Film Projection Cartridge, filed Nov. 1, 1966, by Robert J. Roman; in co-pending U.S. application Ser. No. 591,-249, entitled Projection Cartridge, filed Nov. 1, 1966 by Robert J. Roman; in my co-pending U.S. application Ser. No. 591,314, entitled Automatic Latching Mechanism and Film Guide Arm for a Cartridge-Loaded Motion Picture Projector, filed Nov. 1, 1966, now continuation application Ser. No. 681,295, filed Nov. 7, 1967. Reference may be made to these applications for details of the use of the spindle with the apparatus disclosed.

Spindle 10, preferably molded from a suitable plastic, is an improved construction over the supply spindle disclosed in co-pending U.S. application Ser. No. 397,451 described above. The improved spindle is a hollow cylindrical member having two axially aligned chambers, inner chamber 12 and outer chamber 14, separated by an integrally formed wall 15 (FIG. 2) or a plug 15a (FIG. 2a). The pertinent portion of the projector on which the spindle may be used is illustrated at 16. The projector has a fixed shaft 18 that is received within the spindle inner chamber 12 when the spindle is in operative position on the projector. A silicon-based viscous damping fluid is injected into inner chamber 12 to form a rate-sensitive film or fluid layer between fixed shaft 18 and the inside peripheral surface of the spindle chamber. This viscous damping fluid tends to dampen or smooth out variations in the rotary movement of the spindle assembly on fixed shaft 18. The outer chamber 14 receives the reel drive spring member 20 and the reel detent spring member 22. An end cap 24 fits over a tapered outer end portion 26 of the spindle with the lip 25 of the end cap abutting against the annular shoulder 27 formed on the spindle. The end cap retains the two spring members in their operative assembled position within the outer chamber, and the cap is tapered conforming to the tapered outer end portion 26 to facilitate assembly of the supply reel 28 on the spindle. The supply reel is provided with several drive slots 30, one of which will receive a leg portion of the reel drive spring member 20 for driving engagement of the spindle to the reel in a manner that will be described.

The projector 16 is illustrated only partially, and is shown as having a multi-grooved drive pulley 32 which is free to rotate relative to the fixed drive shaft 18 by means of a belt drive (not shown). The pulley may be selectively clutched for rotatably driving the spindle 10 by being moved axially along shaft 18 until the driving hub 34 on one face of the pulley interengages in side-by-side relation with the lug 36 on the spindle. The details of the belt drive and the structure for accomplishing the clutching and declutching movements of the pulley along the fixed shaft are more fully described in the above-mentioned co-pending U.S. applicaion Ser. No. 397,451. It will be sufficient for purposes of describing this invention if it is known that the hub of the supply reel 28 has a clip (not shown) to which the tail end of the film (not shown) is secured. When all of the film has been projected the tension on the film by the projector film advance mechanism (not shown) will exceed a certain predetermined force and the projector will be automatically tripped into rewind operation. It is during the rewind operation that the multi-grooved pulley 32 is in driving engagement with the spindle 10.

Assembly of spindle

The molded spindle is also provided with several open-ended slots and blind grooves which facilitate the assembly of the reel drive spring member 20 and reel detent spring member 22. The drive spring member 20, a torsion coil spring, has a specially shaped leg portion 40 and a shorter leg portion 42. The two leg portions are forced together and inserted through the outer end opening 44 of the spindle with the shorter leg portion 42 sliding along blind groove or recess 46 until its end abuts the integrally formed wall 15, and with the specially shaped leg portion 40 sliding along slot 48 until its end extends through the opening 50 formed within the annular collar 52 that is integrally formed at the inner end of the spindle. The portion of slot 48 that is inwardly from the wall 15 becomes a blind groove for the purpose to be described.

The detent spring member 22, also a torsion coil spring, has two leg portions 54 each terminated by a lobe 56. The two leg portions are forced together and inserted through the outer end opening 44 of the spindle with the leg portions sliding along the opposed open ended slots 58 until the coil of the detent spring member is brought into abutting engagement with the coil of the drive spring member. The engagement of the detent spring coil with the drive spring coil serves to keep the drive spring member in its operative assembled position within the outer chamber 14.

The end cap 24 is provided on its inside with a projecting annular boss 60 and an annular recess 62 that is defined by the boss and the adjacent sidewall of the end cap. When the end cap is assembled over the tapered outer end portion 26 of the spindle the boss will extend within the terminal end of the tapered outer end portion 26. In this manner, the slots, which have a predetermined width so as to permit the lobes 56 of the reel detent spring member 22 to easily move outwardly and inwardly of the opposed slots 58, will be maintained in spaced apart relation. The lip 25 of the end cap cams the leg portions 54 of the detent spring member inwardly into proper operating position when the end cap is assembled over the tapered outer end portion of the spindle.

Operation of spindle

The spindle 10 is inserted over the fixed shaft 18 after the damping fluid (not shown) is injected in an amount sufficient to line inner chamber 12 when the shaft 18 is in supporting contact with the walls of the chamber. A spring clip 66 holds the spindle for rotation around the shaft but prevents unintentional axial movement of the spindle from the shaft by one leg of the spring passing through an arcuate slot 68 in the inner end portion 70 of the spindle and into the annular groove 72 in the shaft 18. The other leg of the spring clip engages the outer peripheral surface of the spindle in the manner illustrated in FIG. 4.

The reel 28 is inserted over the spindle 10 and moved axially inwardly until it abuts the outer face of the annular collar 52. As the reel passes over the lobes 56 of the detent spring 22 the lobes and the leg portions 54 are depressed inwardly, as shown in dotted lines in FIG. 4. When the reel passes the position of the lobes they spring outwardly again to prevent unintentional axial slippage of the reel from the shaft. The operation of detent springs is conventional and well-known. The reel also may depress the specially shaped leg portion 40 of the drive spring member 20 into the blind groove portion of slot 48, as seen by the dotted line position of this leg portion in FIG. 3, if when the reel is positioned on the spindle none of the drive slots is in alignment with the drive spring member. When the reel is rotated slightly, one of the drive slots 30 in the hub of the reel will be brought into alignment with the specially shaped leg portion 40 so that the leg portion will spring up into driving relation with the drive slot 30. In this manner the reel is keyed to the spindle for rotation therewith.

The length of the spindle outwardly of the reel serves to guide a projection cartridge (not shown) onto the spindle. Reference to the other above-mentioned co-pending applications will illustrate this arrangement.

Another advantage of this spindle construction is that with its increased length over prior art spindles it is easier to manually assemble the two spring members through the outer end opening 44 of the spindle; the spindle construction of U.S. application Ser. No. 397,451 required assembly through the inner end opening.

The invention has been described in detail with particular reference to preferred embodiments thereof, but it will be understood that variations and modifications can be effected within the spirit and scope of the invention as described hereinabove and as defined in the appended claims.

I claim:

1. A spindle assembly adapted to be rotatably mounted on a shaft of a web handling apparatus to support a web supply reel on the apparatus, comprising:
   a hollow tubular member;
   dividing means within said members defining inner and outer axially-aligned chambers, each of said chambers being open at one end remote from said dividing means;

said inner chamber being adapted to receive the shaft of said apparatus; and means within said outer chamber for coupling the web supply reel to said member for rotation therewith.

2. A spindle assembly as defined in claim 1, wherein said dividing means is in the form of a plug inserted into the hollow tubular member to define said chambers.

3. A spindle as defined in claim 1, wherein said dividing means comprises a wall extending transversely of the longitudinal axis of said tubular member to define said chambers.

4. A spindle assembly for rotatably supporting a reel on a shaft of a web handling apparatus, comprising:

a hollow tubular member;

an integrally formed wall within said tubular member defining inner and outer axially-aligned chambers, each chamber being open at one end remote from said wall;

said inner chamber being adapted to receive the shaft of said apparatus to rotatably support said tubular member on the shaft; and reel detent means positioned in said outer chamber and extending therefrom to retain the reel on said member for rotation therewith.

5. A spindle assembly as defined in claim 4, wherein said hollow tubular member has an outer peripheral surface, an annular shoulder on said surface spaced axially inwardly from the open end of said outer chamber, and a tapered end portion extending axially outwardly from said annular shoulder;

said spindle assembly further including an end cap fitted over said tapered end portion to retain within the outer chamber said detent means; said cap having a lip that abuts against said annular shoulder.

6. A spindle assembly as defined in claim 4, wherein said hollow tubular member has a plurality of open-ended slots of predetermined widths and extending axially inwardly along said member from the open end of said chamber, and an outer end portion adjacent the open end of said outer chamber, said detent means being positioned in said slots;

said spindle assembly further comprising: an end cap having a side wall and mounted on the outer end portion of said member to enclose said outer chamber and to retain said detent means within said outer chamber; an axially projecting boss in said end cap; and an annular recess defined by said boss and the adjacent side wall of said cap; the terminal end of said outer end portion of said member being received with said annular recess with said projecting boss fitting within said terminal end, to maintain the predetermined widths of said open-ended slots.

7. A spindle assembly as defined in claim 4, wherein said hollow tubular member has an outer peripheral surface, an annular shoulder on said surface spaced axially inwardly from the open end of said outer chamber, and a tapered outer end portion extending axially outwardly from said annular shoulder;

said tubular member having a plurality of open-ended slots of predetermined widths in the wall thereof, said slots extending axially inwardly along said member from the open end of said outer chamber, said detent means being positioned in said slots;

said spindle assembly further including an end cap mounted on said tapered end portion of said member to retain said detent means within said outer chamber;

said cap having a side wall, an inside end wall and a lip that abuts against said annular shoulder, said cap further having a boss projecting axially from the inside end wall of said cap, said boss defining with the adjacent side wall of said cap an annular recess for receiving the terminal end of said tapered outer end portion, whereby the boss and annular recess maintain said predetermined widths of said open ended slots.

8. A spindle assembly as defined in claim 4 wherein said detent means includes a first spring member for coupling the reel to said tubular member for rotation therewith, and a second spring member for retaining the reel on the spindle;

said tubular member having a plurality of open-ended slots of predetermined widths formed in the wall thereof; said first spring member and said second spring member having portions extending outwardly from said outer chamber through said slots respectively;

said spindle assembly further having an outer end portion and an end cap mounted on said outer end portion to retain said spring members within said outer chamber, said cap having a boss that engages a portion of said second spring member and thereby retains said second spring member in the outer chamber.

9. A spindle assembly as defined in claim 4 wherein said detent means comprises a drive coil spring member and a detent coil spring member, said detent spring member abutting said drive spring member to hold said drive spring member in a predetermined position within said outer chamber;

said spindle assembly further including an outer end portion and an end cap adapted to fit over at least part of the outer end portion of said hollow tubular member and to abut against said detent spring member to hold said detent spring member in abutment with said drive spring member.

10. A spindle assemby as defined in claim 4 and wherein said tubular member includes a generally cylindrical wall defining an outer end portion of said outer chamber, and said detent means comprises a drive coil spring member and a detent coil spring member, said detent spring member abutting against said drive spring member to hold said drive spring member in a predetermined position within said outer chamber;

a plurality of open-ended slots in the wall of the outer end portion of said tubular member extending axially inwardly along said member from the open end of said outer chamber, said tubular member having a pair of elongated recesses, said drive spring member having a pair of leg portions one of which is positioned within one of said elongated recesses for abutment against said integrally formed wall and the other of which overlies the other of said elongated recess and is adapted to be depressed therein during positioning of the reel on said tubular member, said detent spring member having a pair of leg portions each of which fits partly within one of said slots;

said spindle assembly further having an end cap mounted over a part of the outer end portion of said hollow tubular member to abut against said detent spring member to thereby retain said spring members within said outer chamber.

11. A spindle assembly for rotatably supporting a film supply reel on a motion picture apparatus, comprising:

a hollow tubular member having a wall including a surface defining an outer chamber open at one end;

an elongated recess in the surface of said member within said chamber;

at least two elongated slots in the wall of said member;

means having a predetermined position in said elongated recess and one of said slots for rotatably driving the reel;

means having a predetermined position in the other of said slots for retaining the reel on said tubular member, and;

means mounted on the open end portion of said tubular member to enclose said end portion and to maintain said reel retaining means and said reel driving means in said predetermined positions thereof.

12. A spindle assembly as defined in claim 11 wherein said elongated recess and said slots extend axially inwardly from the open end of said outer chamber.

13. A spindle assembly as defined in claim 12 wherein said maintaining means comprises a cap having a wall and an axially projecting boss interiorly thereof, said boss and the wall of said cap defining an annular recess adapted to receive the end of said tubular member to thereby maintain a predetermined width of said slots.

14. A spindle assembly as defined in claim 11 wherein said retaining means and said drive means comprise coil springs respectively and wherein said retaining means engages said drive means and said maintaining means engages said retaining means to thereby maintain said retaining means and said drive means in said predetermined positions thereof.

15. A spindle assembly adapted to be rotatably mounted on a shaft of a web handling apparatus to support a web supply reel on the apparatus, comprising:
a hollow tubular member;
fluid sealing means within said member defining inner and outer axially-aligned chambers on opposite sides of the sealing means, each of said chambers being open at one end remote from said sealing means;
said inner chamber being adapted to contain a viscous damping fluid;
said inner chamber also being adapted to receive the shaft of said apparatus, such that variations in rotary movement of the spindle assembly on the shaft will be damped by the damping fluid; and
means within said outer chamber for coupling the web supply reel to said member for rotation therewith.

References Cited
UNITED STATES PATENTS

| | | | |
|---|---|---|---|
| 902,552 | 11/1908 | Brand | 242—68.3 |
| 1,991,853 | 2/1935 | Howell | 242—68.3 |

FRANK J. COHEN, *Primary Examiner.*

N. L. MINTZ, *Assistant Examiner.*